United States Patent Office 2,980,619
Patented Apr. 18, 1961

2,980,619

MANGANESE ZINC FERRITE CONTAINING TUNGSTIC OXIDE

Kurt Wetzel, New Brunswick, N.J., assignor to Steatite Research Corporation, Keasbey, N.J., a corporation of Delaware No Drawing. Filed Nov. 28, 1958, Ser. No. 776,710

1 Claim. (Cl. 252—62.5)

This invention relates to a manganese zinc ferrite having unusually high saturation flux density.

Among the objects of the invention is to prepare a manganese zinc ferrite with an unusually high saturation flux density.

In the field of ferrites as well as other oxide products made by ceramic procedure, it is a well-known fact that small amounts of "foreign material" present in, or deliberately added to the material, may affect firing behavior and properties of the fired product to a considerable degree. Some of these "foreign materials" act as "mineralizers," that is, they aid in forming the desired aggregate of well-formed and densely-packed crystals necessary for optimum magnetic performance.

In many applications of ferrites, a high saturation flux density is desired, and experimental work has shown that better values for obtaining high saturation values in manganese-zinc ferrites are: carefully controlled firing in protective gas atmosphere ($N_2$, $CO_2$, water vapor, etc.) so as to obtain the ferrite in the most favorable state of oxidation, crystallization, and high density. In pursuing these experiments, it became evident that best values for saturation flux density obtainable under these conditions were in the range of 4800 to 5000 gausses, measured at 25 oersteds, and at 20° C. (room temperature) and that even these figures were obtainable only with difficulty.

This invention is based on the discovery that an addition of about .5 percent by weight of tungstic acid to the same material, resulted in values well over 5000 and even more than 5500 gausses under the same processing and testing conditions.

Therefore, the objects of the invention are obtained by making a manganese-zinc ferrite of high saturation flux density by the addition of from .1 to 1.0 percent by weight of tungstic oxide, $WO_3$ (or other tungsten compounds converting to tungstic oxide on heating) to the manganese oxide, zinc oxide and ferric oxide composition, shaping such compound by pressing or extruding, and firing the shaped product in a protective gas atmosphere.

The proportion of zinc oxide, manganese oxide and ferric oxide in the fired body can vary within rather wide limits, for example, as follows:

Ferric oxide:
    50 to 60 mol percent or 69 to 76 weight percent
Zinc oxide:
    5 to 25 mol percent or 3 to 16 weight percent
Manganese oxide (calc. as MnO):
    45 to 15 mol percent or 28 to 8 weight percent Preferably high grade or relatively pure components are employed to make up the composition. In place of the pure oxides, compounds of zinc, iron or manganese which decompose to form the oxides (for example, the oxalates of these metals) may be employed.

Examples of tungsten compounds converting to tungstic oxide are as follows:

Tungstic acid, $H_2WO_4$, and $H_2WO_4 \cdot H_2O$.

Metallic tungsten may also be used, since at about 700° C. it is converted into $WO_3$.

The products are generally fired at 1300 to 1400° C. A protective gas atmosphere for these ferrites is in general a non-oxidizing atmosphere or one that contains not over about 1% of oxygen. Nitrogen, carbon dioxide, water vapor, cracked ammonia, rare gases like helium, etc. are examples of protective gas atmospheres. A vacuum also is a protective type atmosphere.

The following specific examples illustrate in detail how the process of the invention is carried out.

*Example*

(A) 718 g. of a pure iron oxide, 60 g. of a pure zinc oxide, and 222 g. of a pure manganic oxide ($Mn_2O_3$) are ground with 1500 ml. water for 18 hours in a steel ball mill. The slurry is dried, calcined at temperatures from 800 to 1100° C., re-ground with 1000 ml. water for 18 hours in a steel ball mill and dried. The material is mixed with a suitable organic binder, finely granulated and pressed with the addition of 5 percent by weight of water into suitable shapes. The formed shapes are fired in protective gas atmosphere containing not over 1% $O_2$, at temperatures from 1300° to 1400° C.

(B) To the formula mentioned under (A), 4 g. of pure tungstic acid ($H_2WO_4$) is added either before or during the first or the second milling step, the procedure of preparing and firing the material being exactly the same as under (A).

Magnetic and physical properties of the two fired bodies are:

|  | (A) No additions | (B) Addition of .4% by wt. of $H_2WO_4$ |
|---|---|---|
| $\mu_0$ | 800 | 1,100 |
| $B_s$ | 4,800 | 5,600 |
| $\mu_m$ | 3,000 | 4,000 |
| $H_c$ | .32 | .28 |
| $B_r$ | 1,500 | 1,700 |
| $d$ (g./cc.) | 4.75 | 4.94 |

Similar improvements have been noted on other ferrite bodies prepared within the limits specified above.

The features and principles underlying the invention described above in connection with specific exemplifications will suggest to those skilled in the art many other modifications thereof. It is accordingly desired that the appended claim shall not be limited to any specific feature or details thereof.

I claim:

A manganese-zinc ferrite composed of: ferric oxide in the range of 50 to 60 mol percent, zinc oxide in the range of 5 to 25 mol percent and manganese oxide, calculated as manganese oxide, in the range of 15 to 45 mol percent with the addition of tungstic oxide, in the range of 0.1 to 1 weight percent, said ferrite having a saturation flux density of over 5500 gausses at 25 oersteds measured at 20° C. and being formed by mixing the oxides, molding a body therefrom, and firing the body in a protective neutral gas atmosphere containing less than 1% oxygen to provide a densely packed uniformly crystallized body.

References Cited in the file of this patent

UNITED STATES PATENTS

| | | |
|---|---|---|
| 2,579,978 | Snoek et al. | Dec. 25, 1951 |
| 2,723,238 | Simpkiss | Nov. 8, 1955 |
| 2,764,552 | Buckley et al. | Sept. 25, 1956 |

FOREIGN PATENTS

| | | |
|---|---|---|
| 1,048,444 | France | Aug. 5, 1953 |
| 735,375 | Great Britain | Aug. 17, 1955 |
| 203,822 | Australia | Oct. 18, 1956 |

OTHER REFERENCES

Gorter: Proceedings of the IRE, December 1955, pages 1953, 1960.